United States Patent
Sakai et al.

(10) Patent No.: US 6,750,445 B1
(45) Date of Patent: Jun. 15, 2004

(54) ENCODER

(75) Inventors: Yoshihiro Sakai, Kitakyushu (JP); Hidenori Hasegawa, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/581,818

(22) PCT Filed: Dec. 10, 1998

(86) PCT No.: PCT/JP98/05601

§ 371 (c)(1),
(2), (4) Date: Jun. 19, 2000

(87) PCT Pub. No.: WO99/32854

PCT Pub. Date: Jul. 1, 1999

(30) Foreign Application Priority Data

Dec. 19, 1997 (JP) .............................................. 9-351517

(51) Int. Cl.[7] ................................................. G01D 5/34
(52) U.S. Cl. ............................... 250/231.13; 250/231.16
(58) Field of Search ........................ 250/231.16, 231.14, 250/231.13, 237 G, 237 R, 231.18; 341/11, 13

(56) References Cited

U.S. PATENT DOCUMENTS

| | | | | |
|---|---|---|---|---|
| 4,319,134 A | * | 3/1982 | Weber .................... | 250/231.16 |
| 4,680,466 A | * | 7/1987 | Kuwahara et al. ..... | 250/231.14 |
| 5,073,710 A | * | 12/1991 | Takagi et al. .......... | 250/231.14 |
| 5,091,643 A | * | 2/1992 | Okutani et al. ........ | 250/231.14 |

FOREIGN PATENT DOCUMENTS

| | | | |
|---|---|---|---|
| JP | 63-47223 | 3/1988 | |
| JP | 1-302110 | 12/1989 | |
| JP | 2-47518 | 3/1990 | |
| JP | 4-69714 | 6/1992 | |
| JP | 4-120322 | * 10/1992 | ............ G01D/5/36 |
| JP | 5-52594 | 3/1993 | |
| JP | 6-288789 | 10/1994 | |
| JP | 9-126814 | 5/1997 | |
| JP | 9-159488 | 6/1997 | |

* cited by examiner

*Primary Examiner*—David V. Bruce
*Assistant Examiner*—Chih-Cheng Glen Kao
(74) *Attorney, Agent, or Firm*—Westerman, Hattori, Daniels & Adrian, LLP

(57) ABSTRACT

A slit structure of an encoder for preventing the position precision at high speed operation from deteriorating. An encoder for measuring the rotational speed and rotational position of a rotary slit disc (1) by a light receiving device (4) for receiving light emitted from a light emitting device (2) and transmitted/reflected through/from a code pattern provided in/on the rotary slit disc (1), comprises a fixed slit (3) provided between the rotary slit disc (1) and the light receiving device (4) and having light receiving windows through which the light transmitted/reflected through/from the code pattern passes and which are so arranged at positions different in a radial direction of the rotary slit disc (1) as to have mutually different phases, wherein the lengths of the light receiving windows in the radial direction of the rotary slit disc (1) are greater from the inner peripheral side toward the outer peripheral side so that the opening area of the light receiving window on the inner peripheral side may be equal to that on the outer peripheral side.

2 Claims, 7 Drawing Sheets

ENCODER

BACKGROUND OF THE INVENTION

The present invention relates to an optical encoder to be attached to a rotating axis of a servo motor, etc., in particular, a shape of a light receiving window which is disposed above a slit into which light comes.

BACKGROUND OF THE ARTS

An optical rotary encoder is such that a code pattern is provided on a rotary disk constructed of glass, etc., light from a light emitting element such as an LED, etc., is made incident into the code pattern, light transmitted through or reflected from the code pattern is received directly by a light receiving element such as a photo diode, etc., or via a light receiving window. And a minute current of the light receiving element is amplified by a circuit substrate and is converted to adjusted electric signals, wherein the electric signals are multiplied, interpolated or pulsated to detect the rotating speed or rotating position of the abovementioned disk.

In the above rotary encoder, the quantity of light received by respective light receiving elements is not the same, and differences may arise in the minute current in the light receiving elements. Therefore, in the case where the minute current is amplified by the circuit substrate and converted to electric signals, a difference occurs in the degree of amplification in the respective light receiving elements.

Where electric signals are multiplied, interpolated or pulsated with respect to progress of high accuracy, if there is a difference in the respective basic signals, a problem in the frequency characteristics arises, which causes a lowering of the position precision at a high speed operation.

BRIEF SUMMARY OF THE INVENTION

Therefore, the present invention was developed to solve the above problem, and it is therefore an object of the invention to provide an encoder that can prevent the position precision at a high speed operation from deteriorating.

DISCLOSURE OF THE INVENTION

An encoder according to the invention is an encoder having a code pattern provided on a rotary disk, which detects the rotation speed and rotational position of the rotary disk by receiving light coming from a light emitting element and transmitted through or reflected from the code pattern by the light receiving element; wherein a fixed slit which is disposed between the rotary disk and the light receiving element so that a plurality of light receiving windows through which light reflected from or transmitted through the code pattern passes is disposed so as to have a difference in phase at different positions in the radial direction of the rotary disk; the length of the light receiving windows in the radial direction is set so as to gradually become shorter from the inner peripheral side toward the outer peripheral side; and the opening area of the light receiving windows at the inner peripheral side of the fixed slit is set to be equal to that at the outer peripheral side.

An encoder having a code pattern provided on a rotary disk, which detects the rotation speed and rotation position of the rotary disk by receiving light transmitted through or reflected from the code pattern by light receiving elements; wherein the light receiving elements have a plurality of light receiving portions to receive light, coming from a light emitting element, transmitted from or reflected from the code pattern, which are disposed so that it has a difference in phase in different positions in the radial direction of the rotary disk; the length of the rotary disk of the light receiving portions in the radial direction is set so as to gradually become shorter from the inner peripheral side toward the outer peripheral side; the area of the light receiving portion at the inner peripheral side of the light receiving element is set to be equal to that at the outer peripheral side.

According to the encoder of the invention, since the length, of the light receiving window or rotary disk having the shape of the light receiving portions, in the radial direction is set so as to gradually become shorter from the inner peripheral side to the outer peripheral side, the area of the light receiving windows or the light receiving portion can be set to be the same regardless of the position of the rotary disk in the radial direction.

DESCRIPTION OF THE PREFERRED EMBODIMENTS

Figure 1:
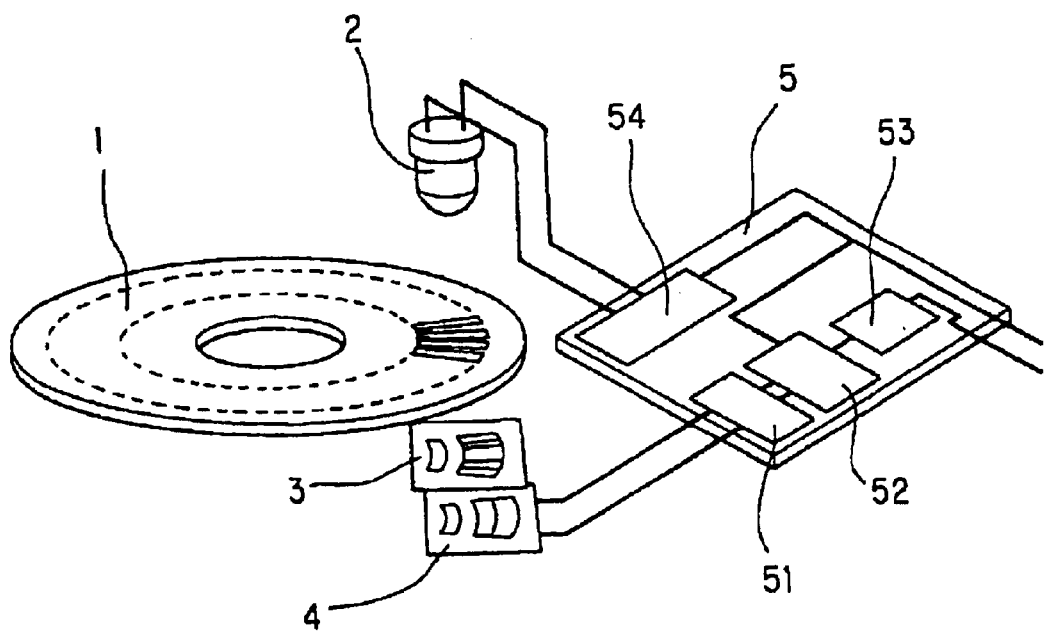
FIG. 1 is a configurational view of an encoder according to a preferred embodiment according to the invention.
Figure 2:
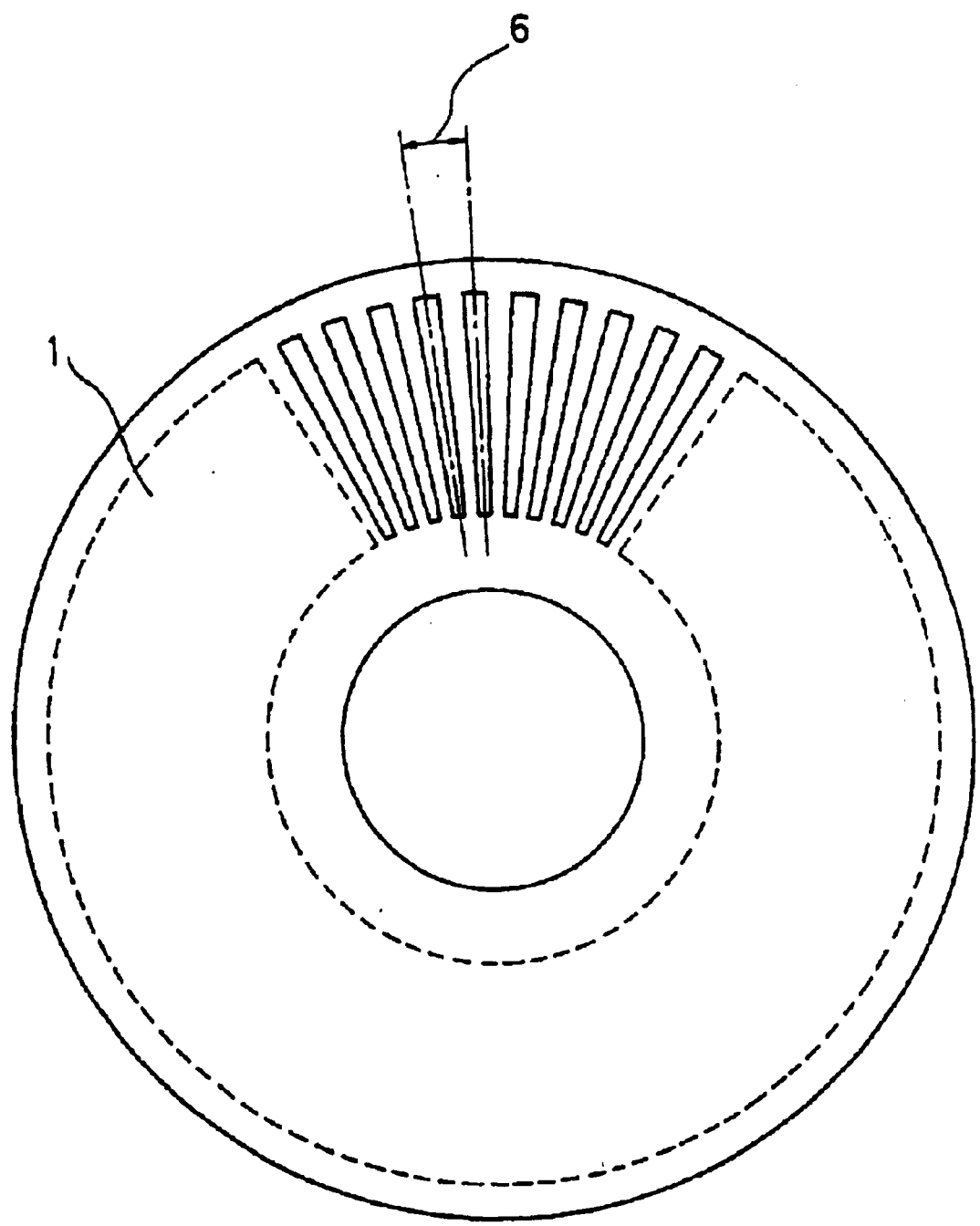
FIG. 2 is a plan view of a rotary slit disk 1 shown in FIG. 1.

FIG. 1 is a configurational view of a preferred embodiment of the invention, and FIG. 2 is a plan view of a rotary slit disk constituting the encoder. In FIG. 1, 1 is a rotary slit disk such as glass, etc., which is fixed, directly or via an axial joint such as a coupling, at a motor shaft for which the rotation position or rotating speed is intended to be detected. As illustrated in FIG. 2, a code pattern of the reference pitch 6 is provided on the rotary slit disk 1. 2 is a light emitting element such as an infrared LED, etc., 3 is a fixed slit, having a light receiving window of a shape described later, which transmits a parallel light beam irradiated from the light emitting element 2 and transmitted through the code pattern on the rotary slit disk 1. 4 is a light receiving element such as a photo diode, etc. 5 is a circuit substrate that comprising an amplification portion 51 which converts photo-current converted signals to voltage at the light receiving element 4, a waveform processing circuit 52 for multiplication, interpolation and pulsation, an output circuit 53 and an LED drive circuit 54.

Figure 3:
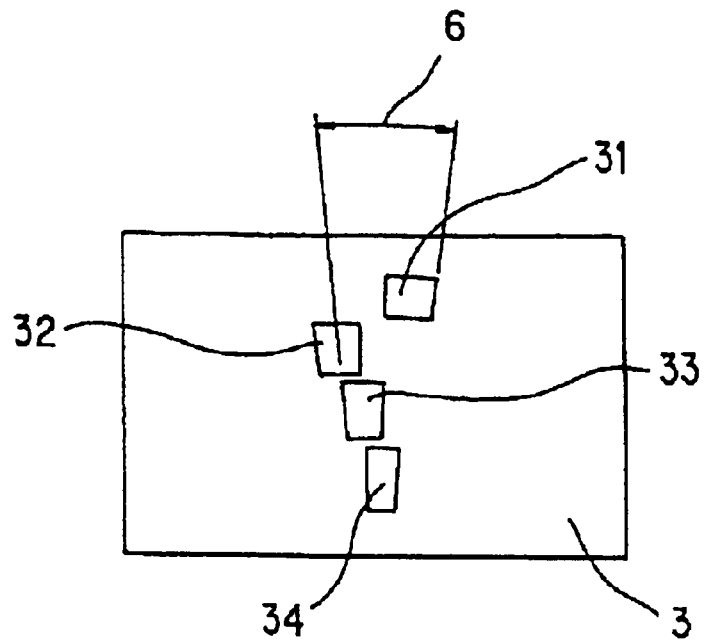
FIG. 3 is a detailed view showing a light receiving window secured at a fixed slit 3 shown in FIG. 1.

FIG. 3 shows light receiving windows provided at the fixed slit 3. Light receiving windows 31, 32, 33, and 34 located at different positions on the same radius are, respectively, disposed with a difference of 90° in the positional phase with reference to the basic pitch. The respective light receiving windows are established so that the length thereof in the radial direction from the outer peripheral side toward the inner peripheral side gradually becomes greater in order to make the opening area of the light receiving window on the outer peripheral side equal to that on the inner peripheral side.

Light of a light emitting diode 2 such as an infrared LED, etc., is irradiated in a state where the rotary slit disk 1 is rotated at a constant speed of revolution, and light transmitted through the code pattern of the rotary slit disk 1 and the light receiving window of the fixed slit 3 is made incident into the light receiving element 4 (See FIG. 4), whereby photo-current converted minute currents (See FIG. 5) are obtained.

Figure 4:
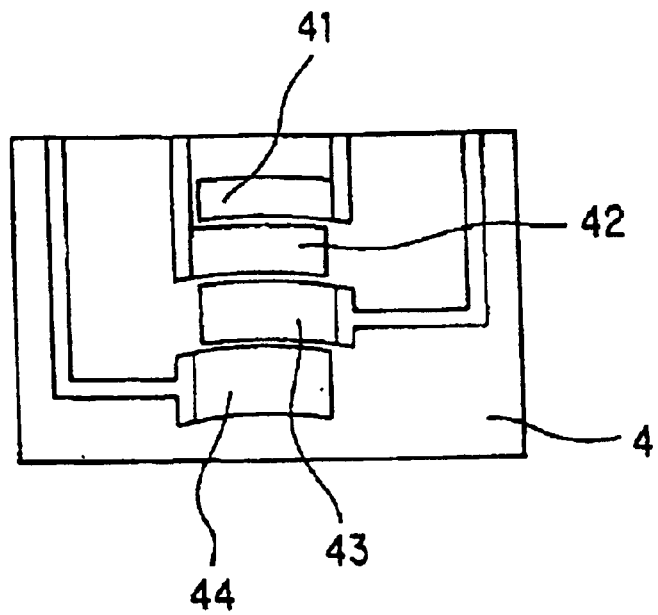
FIG. 4 is a detailed view showing a light receiving portion secured at a light receiving element 4 shown in FIG. 1.

As shown in FIG. 4, respective light receiving portions 41, 42, 43, and 44 which constitutes the light receiving element 4, respectively, correspond to the light receiving windows 31, 32, 33 and 34 of the fixed slit.

Figure 5:
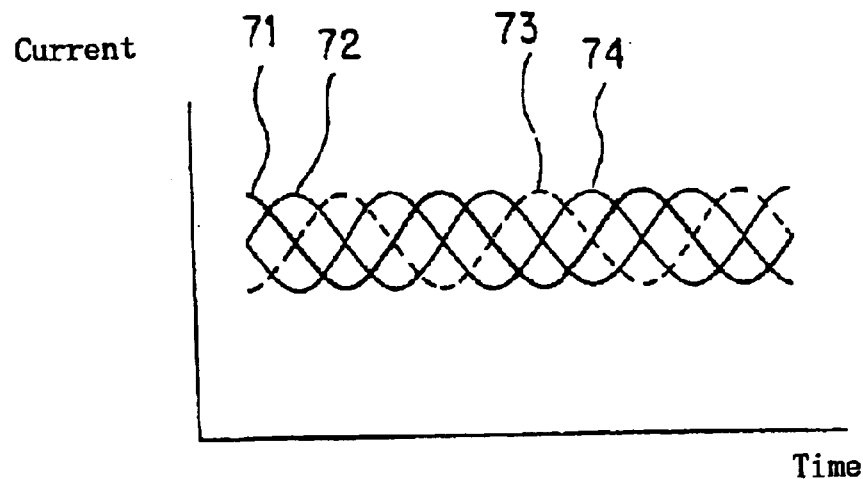
FIG. 5 is a view showing a current waveform of the light receiving element 4.

In addition, since the opening areas of the respective light receiving windows of the fixed slit 3 are equal to each other, the quantities of light received by the respective light receiving portions of the light receiving elements are made equal to each other, whereby as shown in FIG. 5, the minute currents, that is, the minute currents 71, 72, 73, and 74 obtained at the respective light receiving portions 41, 42, 43 and 44 express the same intensity.

Figure 6:
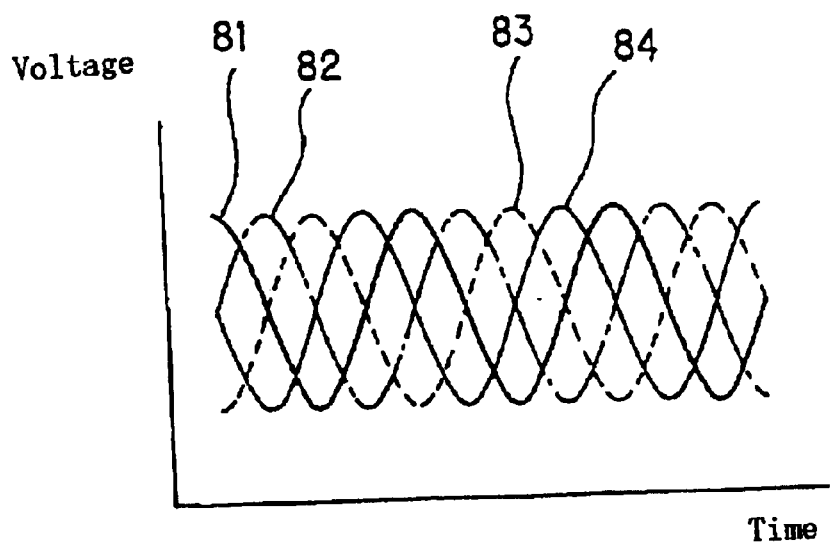
FIG. 6 is a view showing a waveform of amplified voltage.

FIG. 6 shows the results of having converted the currents having characteristics shown in FIG. 5 to voltage. The minute currents obtained at the light receiving portions are converted to voltage by a series resistance method, etc., by the amplification portion 51. Resultantly, as shown in FIG. 6, the respective signals 81, 82, 83, and 84 will have a waveform having the same amplitude (voltage).

Since the signals 81, 82, 83 and 84 thus obtained have the same frequency characteristics when being multiplied, interpolated or pulsated by the waveform processing circuit 52, no fluctuation occurs in the difference in positional phase at a high speed rotation, and flutter is not increased, which may be produced during high speed operation when carrying out multiplication by using a bridging circuit, etc. Also, even in a case where the rotating position is digitalized through analog-digital conversion, it is possible to achieve an encoder all having better position precision in a wide range.

Figure 7:
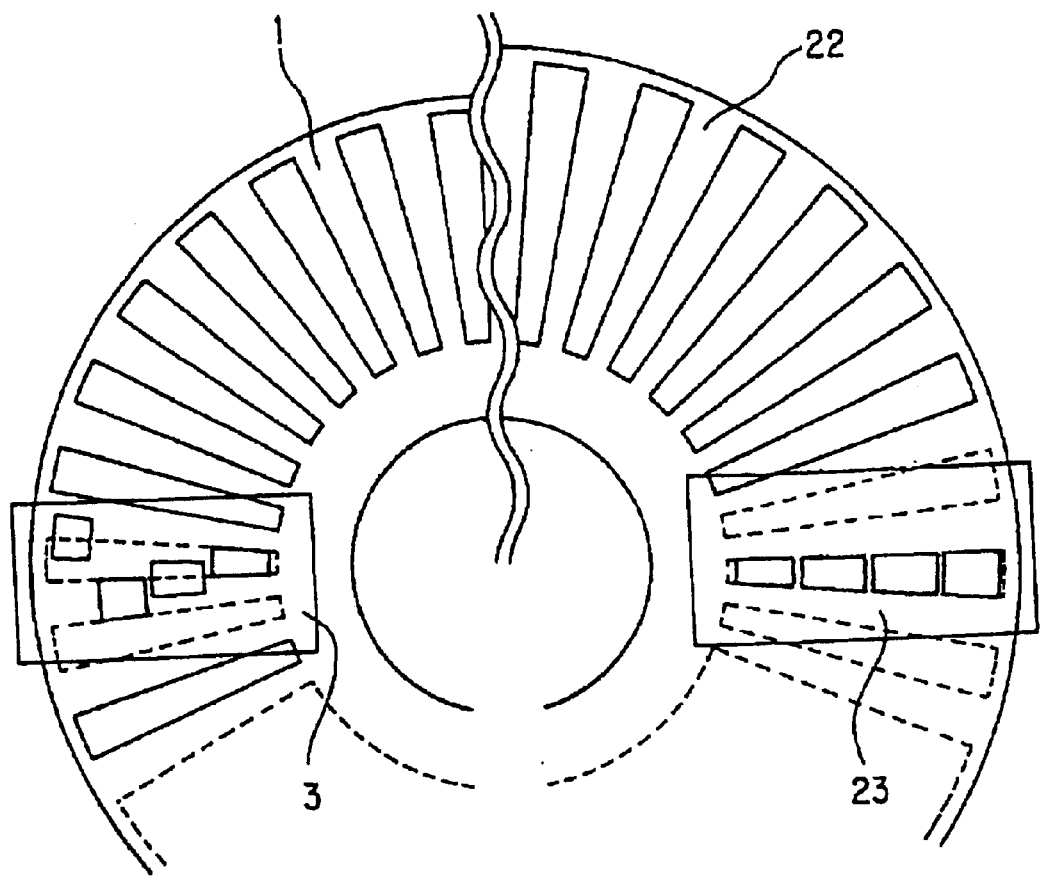
FIG. 7 is a view showing a rotary slit disk 1 and fixed slit 3 according to the preferred embodiment, and showing a prior art rotary slit disk 22 and fixed slit 23.

In addition, since the length of respective light receiving windows, which constitute the fixed slit 3, in the radial direction is set so as to be gradually shorter from the inner peripheral side toward the outer peripheral side, it is possible to design to have a smaller diameter of the rotary slit disk 1. That is, as shown in FIG. 7, the length of the respective light receiving windows, which constitute the prior art fixed slit 23, in the radial direction is set so as to be the same in all the radial directions of the rotary slit disk 22. On the other hand, since the length of the respective light receiving windows, which constitute the fixed slit 3 of the embodiment, in the radial direction are set to be gradually smaller toward the outer peripheral side, the diameter of the rotary slit disk 1 can be designed to be smaller in line therewith.

Figure 8:
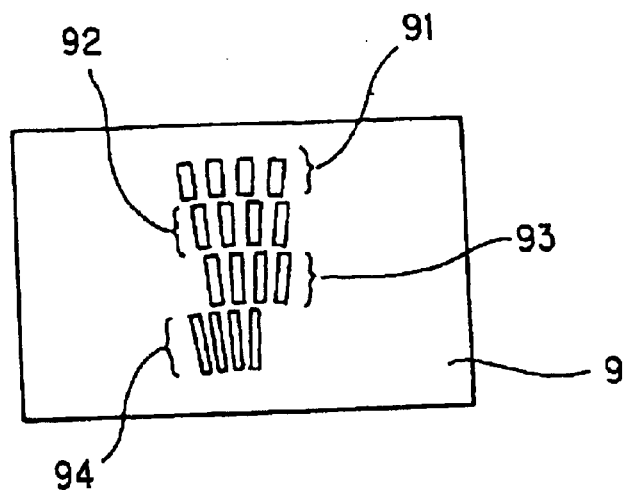
FIG. 8 is a detailed view of a light receiving window secured at a fixed slit 9 according to another embodiment.
Figure 9:
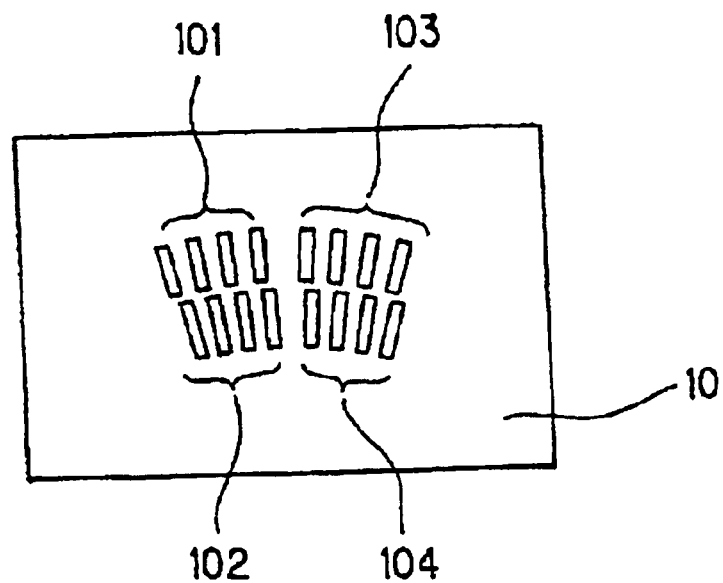
FIG. 9 is a detailed view of a light receiving window secured at a fixed slit 10 according to still another embodiment.

Also, as shown in FIG. 8 and FIG. 9, the encoder is such that, in order to increase resolution power, a plurality of light receiving windows 91, 92, 93, and 94, and 101, 102, 103 and 104 (groups of the light receiving windows) of the same phase are, respectively, formed in the slits 9 and 10. However, in this case, the total sum of the opening areas of the light receiving windows of the same phase and the total sum of the opening areas of the light receiving windows of the other phase are set so as to be equal to each other.

Figure 10:
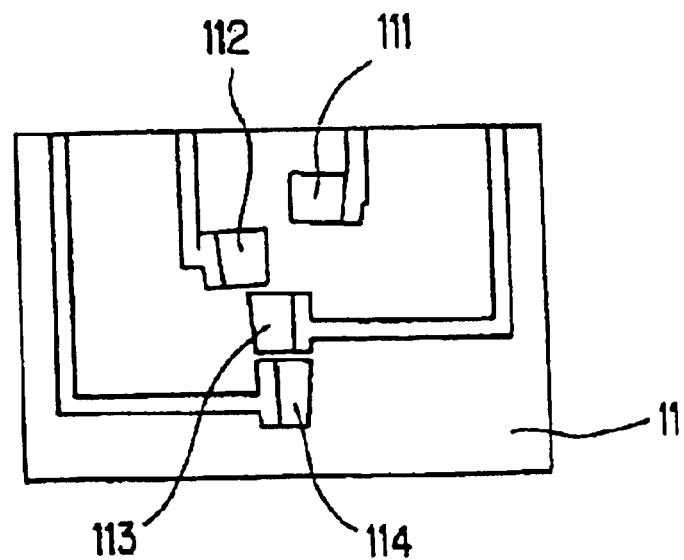
FIG. 10 is a detailed view of a light receiving window secured at a fixed slit 11 according to further another embodiment.

In addition, as shown in FIG. 10, in a construction where the fixed slit and light receiving elements are made common, that is, in a construction where a slit is formed on a photo diode, the length of the respective light receiving portions 111, 112, 113, and 114 of the light receiving element 11 in the radial direction is set so as to become gradually longer from the outer peripheral side toward the inner peripheral side, whereby the areas of the respective light receiving portions are set so as to become equal to each other.

Figure 11:
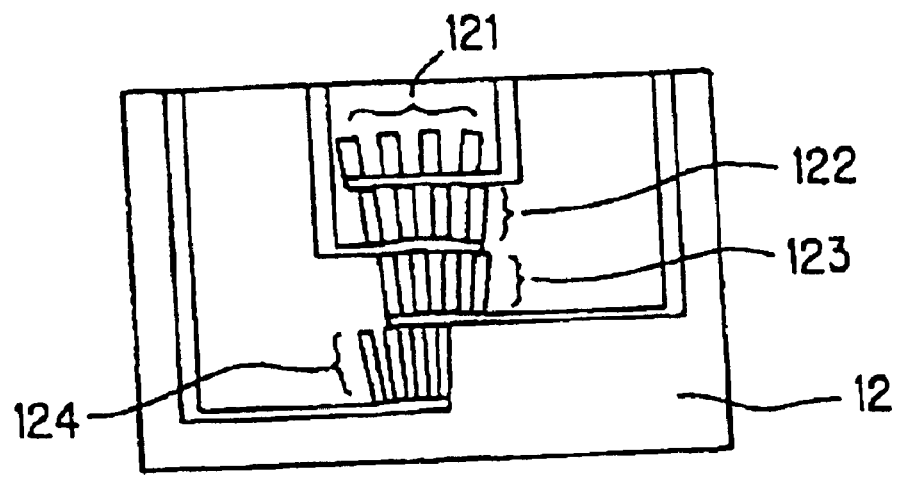
FIG. 11 is a detailed view of a light receiving window secured at a fixed slit 12 according to further another embodiment.
Figure 12:
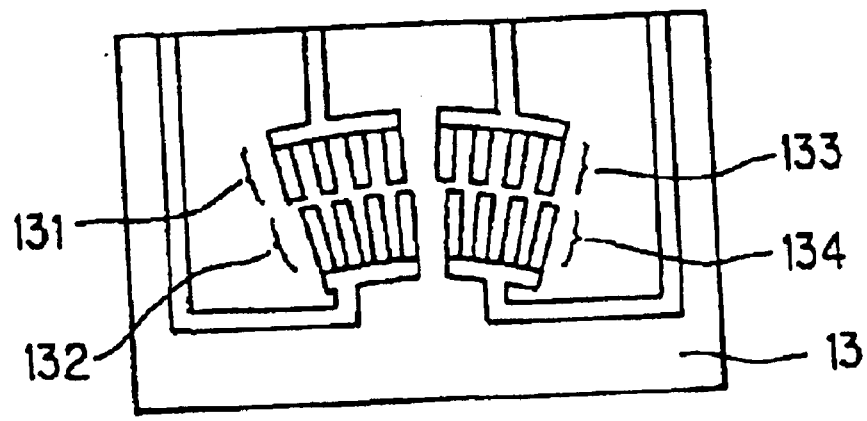
FIG. 12 is a detailed view of a light receiving window secured at a fixed slit 13 according to further another embodiment.

Further, as shown in FIG. 11 and FIG. 12, in a construction where the fixed slit and light receiving elements are made common, that is, in a construction where a slit is formed on a photo diode, a plurality of light receiving portions 121, 122, 123, 124, and 131, 132, 133 and 134 (group of light receiving portions) of the same phase are provided at the light receiving elements 12 and 13, corresponding to the fixed slits 9 and 10 shown in the previous drawings FIG. 8 and FIG. 9, and the total sum of the area of the light receiving portions of the same phase and the total sum of the areas of the light receiving portions of the other phase are set so as to be equal to each other.

As described above, the encoder of the invention is an encoder having a code pattern provided on a rotary disk, in which light coming from a light emitting element and transmitted through or reflected from the code pattern is received by the light receiving element, and that detects the rotation speed and rotational position of the rotary disk; wherein a fixed slit is disposed between the rotary disk and the light receiving element so that a plurality of light receiving windows through which light reflected from or transmitted through the code pattern passes are disposed so as to have a difference in phase at different positions in the radial direction of the rotary disk; the length of the light receiving windows in the radial direction is set so as to become gradually shorter from the inner peripheral side toward the outer peripheral side; and the opening area of the light receiving windows at the inner peripheral side of the fixed slit is set to be equal to that at the outer peripheral side; or the encoder having a code pattern provided on a rotary disk, which detects the rotation speed and rotation position of the rotary disk by receiving light transmitted through or reflected from the code pattern by light receiving elements; wherein the light receiving elements have a plurality of light receiving portions to receive light, coming from a light emitting element, transmitted from or reflected from the code pattern, which are disposed so that they have differences in phase in different positions in the radial direction of the rotary disk; the length of the rotary disk of the light receiving portions in the radial direction is set so as to gradually become shorter from the inner peripheral side toward the outer peripheral side; the area of the light receiving portion at the inner peripheral side of the light receiving element is set to be equal to that at the outer peripheral side.

Therefore, the amount of light which the light receiving elements receive can be made the same regardless of the position of the rotary disk. Accordingly, it is possible to prevent an increase in high speed flutter arising due to fluctuations of the difference in the phase at high speed operation or when performing multiplication using a bridging circuit, etc. Also, even in a case where the rotational position is converted to digital signals by analog-digital conversion, it is possible to provide an encoder which enables better rotational precision over a wide range. Further, since the area of the light receiving windows and that of the light receiving portions can be made equal to each other regardless of the positions of the rotary disk, the length in the radial direction is set so as to gradually become shorter from the inner peripheral side toward the outer peripheral side. Therefore, the diameter of the rotary disk can be designed to be smaller than that of the prior art disks. In particular, an encoder having a number of tracks having high resolution power can be small in size.

INDUSTRIAL APPLICABILITY

An encoder according to the invention detects the rotation speed and position of a rotating axis of a servo motor, whereby it can be utilized where rotational position and speed are intended to be controlled at a very high precision.

What is claimed is:

1. An encoder having a code pattern provided on a rotary disk, which detects the rotation speed and rotational position of the rotary disk by receiving light coming from a light emitting element and transmitted through or reflected from said code pattern by a light receiving element; wherein a fixed slit which is disposed between said rotary disk and said light receiving element so that a plurality of light receiving windows through which light reflected from or transmitted through the code pattern passes is disposed so as to have a difference in phase at different positions in the radial direction of the rotary disk; the length of said light receiving windows in the radial direction is set so as to gradually become shorter from the inner peripheral side toward the outer peripheral side; and the opening area of said light receiving windows at the inner peripheral side of said fixed slit is set to be equal to that at the outer peripheral side, wherein said light receiving windows are a group of light receiving windows, consisting of a plurality of light receiving windows disposed on the same radius at the same phase, and the total sum of the opening areas of light receiving windows of the same phase and the total sum of light receiving windows of another phase are set to be equal to each other, wherein a plurality of groups of light receiving windows are disposed at each of said different positions in the radial direction of the rotary disk and wherein groups of light receiving windows at the same radial position have the same phase.

2. An encoder having a code pattern provided on a rotary disk, which detects the rotation speed and rotational position of the rotary disk by receiving light coming from a light emitting element and transmitted through or reflected from said code pattern by light receiving elements; wherein said light receiving elements have a plurality of light receiving portions to receive light, coming from a light emitting element, transmitted from or reflected from said code pattern, which are disposed so that they have differences in phase in different positions in the radial direction of said rotary disk, the length of the light receiving portions in the radial direction is set so as to gradually become shorter from the inner peripheral side toward the outer peripheral side; the area of the light receiving portion at the inner peripheral side of the light receiving element is set to be equal to that at the outer peripheral side, wherein said light receiving portions are a group of light receiving portions consisting of a plurality of light receiving portions disposed on the same radius at the same phase, and the total sum of the opening areas of light receiving portions of the same phase and the total sum of light receiving portions of another phase are set to be equal to each other, wherein a plurality of groups of light receiving portions are disposed at each of said different positions in the radial direction of the rotary disk and wherein groups of light receiving portions at the same radial position have the same phase.

* * * * *